US012581245B2

(12) United States Patent
Zhang et al.

(10) Patent No.: US 12,581,245 B2
(45) Date of Patent: Mar. 17, 2026

(54) LOUDSPEAKER

(71) Applicant: MERRY ELECTRONICS (SUZHOU) CO., LTD., Suzhou City (CN)

(72) Inventors: Yuanyuan Zhang, Suzhou City (CN); Mingya Luo, Suzhou City (CN); Meng Xu, Suzhou City (CN); Xue Li, Suzhou City (CN); Xiaoxiang Wei, Suzhou City (CN)

(73) Assignee: MERRY ELECTRONICS (SUZHOU) CO., LTD., Suzhou City (CN)

(*) Notice: Subject to any disclaimer, the term of this patent is extended or adjusted under 35 U.S.C. 154(b) by 256 days.

(21) Appl. No.: 18/223,871

(22) Filed: Jul. 19, 2023

(65) Prior Publication Data

US 2024/0348985 A1 Oct. 17, 2024

(30) Foreign Application Priority Data

Apr. 14, 2023 (CN) ......................... 202310397373.6

(51) Int. Cl.
*H04R 9/06* (2006.01)
*H04R 1/28* (2006.01)
*H04R 9/02* (2006.01)
*H04R 9/04* (2006.01)

(52) U.S. Cl.
CPC ............ *H04R 9/06* (2013.01); *H04R 1/2811* (2013.01); *H04R 9/025* (2013.01); *H04R 9/046* (2013.01); *H04R 2209/027* (2013.01); *H04R 2209/041* (2013.01)

(58) Field of Classification Search
None
See application file for complete search history.

(56) References Cited

U.S. PATENT DOCUMENTS

2002/0051557 A1* 5/2002 Kobayashi ............... H04R 9/06 381/401
2005/0111673 A1* 5/2005 Rosen ................ B60R 11/0217 381/89
2007/0102270 A1* 5/2007 Takashima ............. H04R 11/02 200/83 R
2016/0021441 A1* 1/2016 Shao ........................ H04R 1/24 381/412
2023/0269539 A1* 8/2023 Zhang .................... H04R 9/063 381/400
2024/0348979 A1* 10/2024 Zhang ...................... H04R 9/06
2024/0348982 A1* 10/2024 Zhang ...................... H04R 9/06

* cited by examiner

*Primary Examiner* — Walter F Briney, III
(74) *Attorney, Agent, or Firm* — Birch, Stewart, Kolasch & Birch, LLP

(57) ABSTRACT

Provided is a loudspeaker. The loudspeaker includes a shell, a vibration structure, a magnetic circuit structure and a voice coil. The shell includes a main shell, an inner support body and an elastic member. The inner support body is connected to the main shell body through the elastic member, multiple inner support bodies are provided, and the multiple inner support bodies are disposed in a surrounding manner to define an inner support cavity that penetrates in a first direction. The vibration structure is connected to the main shell. The magnetic circuit structure is located in the inner support cavity and is sandwiched between the multiple the inner support bodies. The voice coil includes a main voice coil and an auxiliary voice coil.

10 Claims, 5 Drawing Sheets

LOUDSPEAKER

CROSS-REFERENCE TO RELATED APPLICATIONS

This application claims priority to Chinese Patent Application No. 202310397373.6 filed Apr. 14, 2023, the disclosure of which is incorporated herein by reference in its entirety.

TECHNICAL FIELD

The present disclosure relates to the technical field of loudspeakers, and in particular to, a loudspeaker.

BACKGROUND

A inside space of a vibration structure on the loudspeaker serves as a rear cavity, and a voice coil, a magnetic pole piece, a magnet and a yoke are disposed in the rear cavity. The voice coil is connected to the vibration structure. The magnetic pole piece, the magnet and the yoke constitute a magnetic circuit structure, and the magnetic circuit structure is connected to a shell supporting the vibration structure. When the alternating current is connected, the voice coil drives the vibration structure to vibrate and sound under the action of the ampere force. At this time, the magnetic circuit structure constituted by the magnetic pole piece, the magnet and the yoke is subjected to a reverse acting force, the reverse acting force and the ampere force to which the voice coil is subjected are equal in magnitude and opposite in direction. The reverse acting force is finally conducted to the shell of the loudspeaker, thereby causing the excessive vibration of the shell, causing the damage to the sound quality, and affecting the use feeling of the consumers.

SUMMARY

The present disclosure provides a loudspeaker, which can reduce the impact force of a magnetic circuit structure on a shell during the sound production operation.

For this purpose, the present disclosure adopts the following technical solutions.

A loudspeaker is provided. The loudspeaker includes a shell, a vibration structure, a magnetic circuit structure and a voice coil. The shell includes a main shell, an inner support body and an elastic member. The inner support body is connected to the main shell body through the elastic member, multiple inner support bodies are provided, and the multiple inner support bodies are disposed in a surrounding manner to define an inner support cavity that penetrates in a first direction. The vibration structure is connected to the main shell. The magnetic circuit structure is located in the inner support cavity and is sandwiched between the multiple the inner support bodies. The voice coil includes a main voice coil and an auxiliary voice coil, the main voice coil is connected to the vibration structure and is movable in the first direction relative to the magnetic circuit structure, the auxiliary voice coil is disposed around an outer periphery of the main voice coil and connected to the main shell, when the main voice coil and the auxiliary voice coil are energized for operation, a direction of an acting force applied to the magnetic circuit structure by the main voice coil is opposite to a direction of an acting force applied to the magnetic circuit structure by the auxiliary voice coil.

In an embodiment, the elastic member is sandwiched between the main shell body and the multiple inner support bodies in a direction perpendicular to the first direction.

In an embodiment, the elastic member is laid within the main shell, one of the inner support body among the multiple inner support bodies and the elastic member is provided with a first convex head, and the other of the inner support body among the multiple inner support bodies and the elastic member is provided with a first groove, and the first convex head extends into the first groove.

In an embodiment, the magnetic circuit structure includes a yoke, a main magnetic pole structure and an auxiliary magnetic pole structure. The yoke is sandwiched between the multiple inner support bodies. The main magnetic pole structure is disposed on the yoke, and the main voice coil is disposed around an outer periphery of the main magnetic pole structure. The auxiliary magnetic pole structure is disposed on the yoke and located outside the main voice coil, and the auxiliary voice coil is disposed around an outer periphery of the auxiliary magnetic pole structure.

In an embodiment, the yoke includes a bottom plate portion and multiple support plate portions connected to the bottom plate portion. The main magnetic pole structure and the auxiliary magnetic pole structure are each disposed on the bottom plate portion and located between the multiple support plate portions, and the multiple support plate portions abut against the multiple inner support bodies.

In an embodiment, support plate portions at two ends of the bottom plate portion in a second direction are first support plate portions, the first support plate portions are located inside the auxiliary voice coil, and the second direction is perpendicular to the first direction.

In an embodiment, support plate portions at two ends of the bottom plate portion in a third direction are second support plate portions, two auxiliary magnetic pole structures are provided, the main magnetic pole structure are sandwiched between the two auxiliary magnetic pole structures in the third direction, the second support plates are located outside the auxiliary voice coil, and the third direction is perpendicular to the first direction and the second direction.

In an embodiment, the main magnetic pole structure includes a main magnet and a main magnetic pole piece. The main magnet is ring-shaped and disposed on a side of the yoke facing the vibration structure. The main magnetic pole piece is ring-shaped and disposed on a side of the main magnet facing the vibration structure.

In an embodiment, the auxiliary magnetic pole structure includes an auxiliary magnet and an auxiliary magnetic pole piece. The auxiliary magnet is elongated and disposed on a side of the yoke facing the vibration structure. The auxiliary magnetic pole piece is elongated and disposed on a side of the auxiliary magnet facing the vibration structure.

In an embodiment, the auxiliary magnetic pole piece includes a first piece body and a second piece body connected to each other, a thickness of the first piece body in the first direction is greater than a thickness of the second piece body in the first direction, and the first piece body faces away from the main magnetic pole structure relative to the second piece body.

REFERENCE LIST

Figure 1:
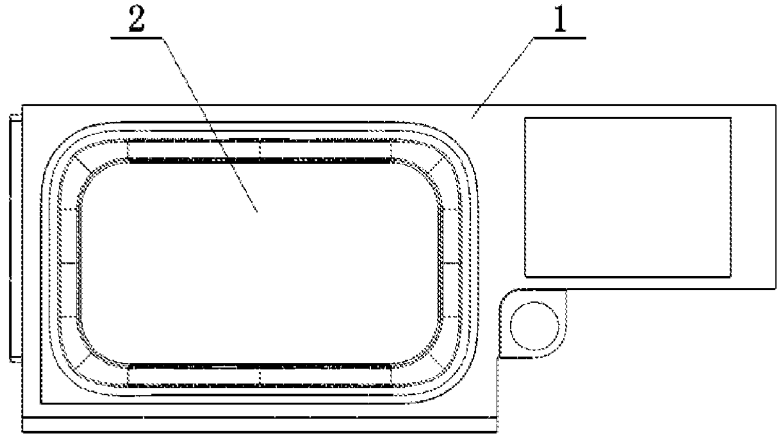
FIG. 1 is a front view of a loudspeaker according to an embodiment of the present disclosure.

1 shell
11 main shell body
111 support plate portion
112 second convex head
12 inner support body
121 first convex head
13 elastic member
131 first groove
132 second groove
2 vibration structure
3 magnetic circuit structure
31 yoke
311 bottom plate portion
312 support plate portion
32 main magnetic pole structure
321 main magnet
322 main magnetic pole piece
33 auxiliary magnetic pole structure
331 auxiliary magnet
332 auxiliary magnetic pole piece
3321 first piece body
3322 second piece body
4 voice coil
41 main voice coil
42 auxiliary voice coil

DETAILED DESCRIPTION

Embodiments of the present disclosure will be described in detail below, examples of the described embodiments are shown in the accompanying drawings, where same or similar reference numerals refer to same or similar parts or parts having same or similar functions throughout. The embodiments described below with reference to the accompanying drawings are exemplary, are intended to explain the present disclosure, and are not be construed as limiting the present disclosure.

In the description of the present disclosure, unless otherwise expressly specified and limited, the term "connected to each other", "connected", or "fixed" is to be construed in a broad sense, for example, as securely connected, or detachably connected: mechanically connected or electrically connected: directly connected to each other, indirectly connected to each other via an intermediary, internal connection between two elements, or interaction between two elements. For those of ordinary skill in the art, specific meanings of the preceding terms in the present disclosure may be understood based on specific situations.

In the description of the present disclosure, unless otherwise expressly specified and limited, a first feature being "on" or "under" a second feature may include the first feature and the second feature being in direct contact, or may include the first feature and the second feature not being in direct contact but being in contact with each other through an additional feature therebetween. Moreover, the first feature being "on", "above" or "over" the second feature includes the first feature being directly on, above or over and obliquely on, above or over the second feature, or simply indicates that the first feature is at a higher level than the second feature. The first feature being "under", "below" or "underneath" the second feature includes the first feature being directly under, below or underneath and obliquely under, below or underneath the second feature, or simply represents that the first feature is at a lower level than the second feature.

The technical solutions of the present disclosure are further explained hereinafter in conjunction with drawings and the specific implementation mode.

Figure 2:
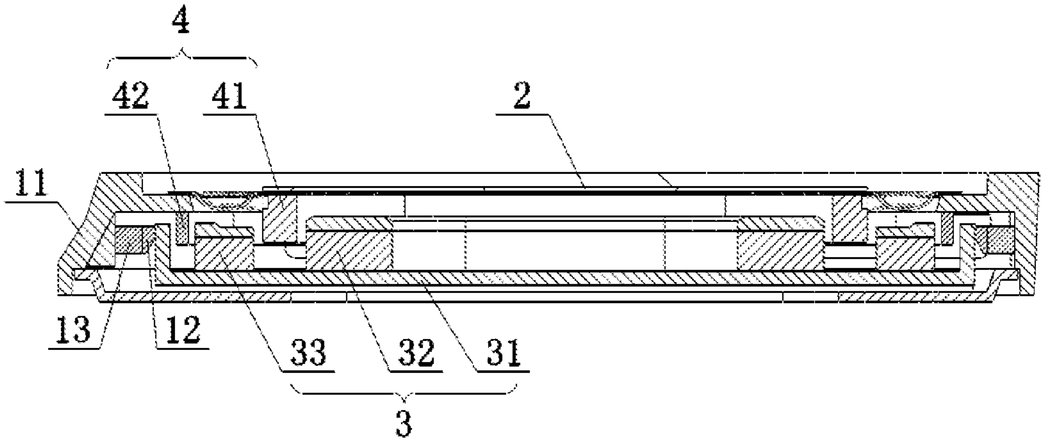
FIG. 2 is a sectional view of a loudspeaker according to an embodiment of the present disclosure.
Figure 3:
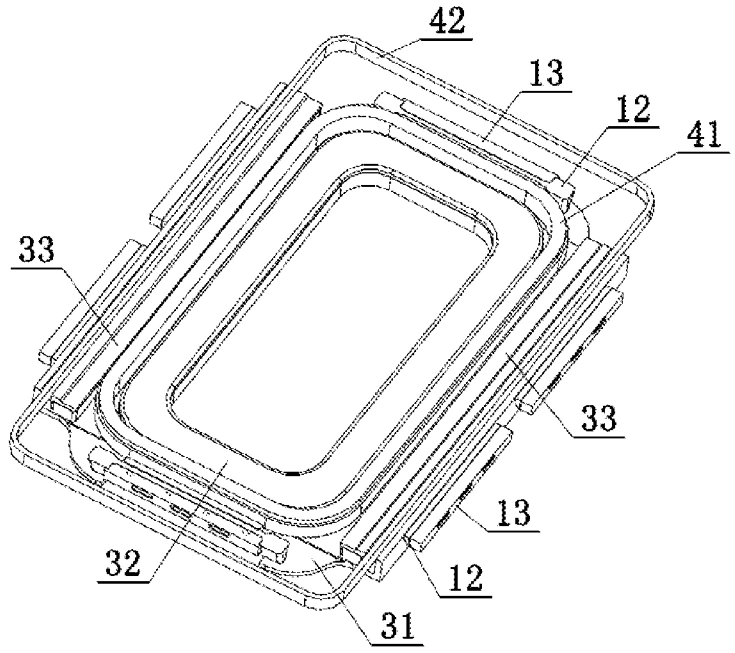
FIG. 3 is a structure view of a loudspeaker according to an embodiment of the present disclosure, with a main shell body and a vibration structure removed.
Figure 4:
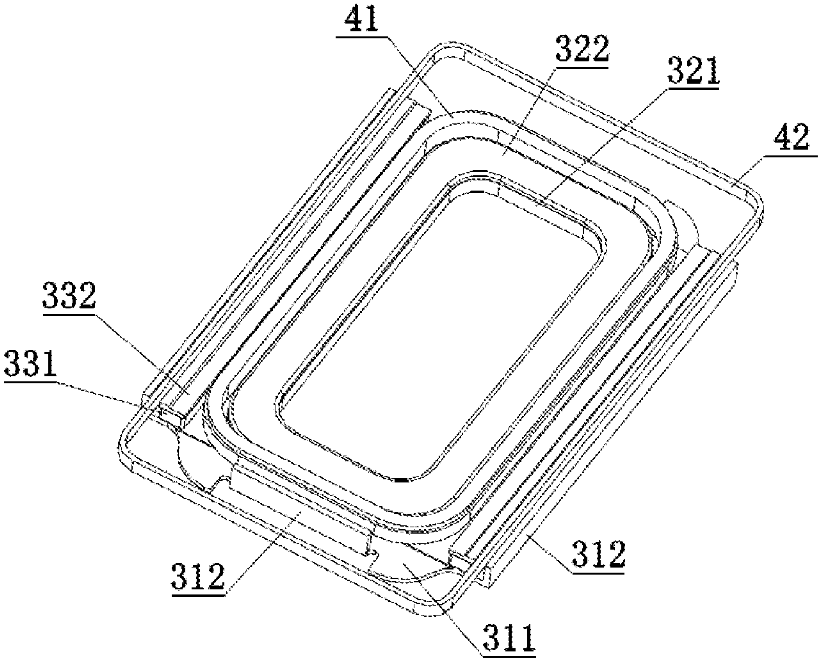
FIG. 4 is a structure view of a loudspeaker according to an embodiment of the present disclosure, with a shell and a vibration structure removed.
Figure 5:
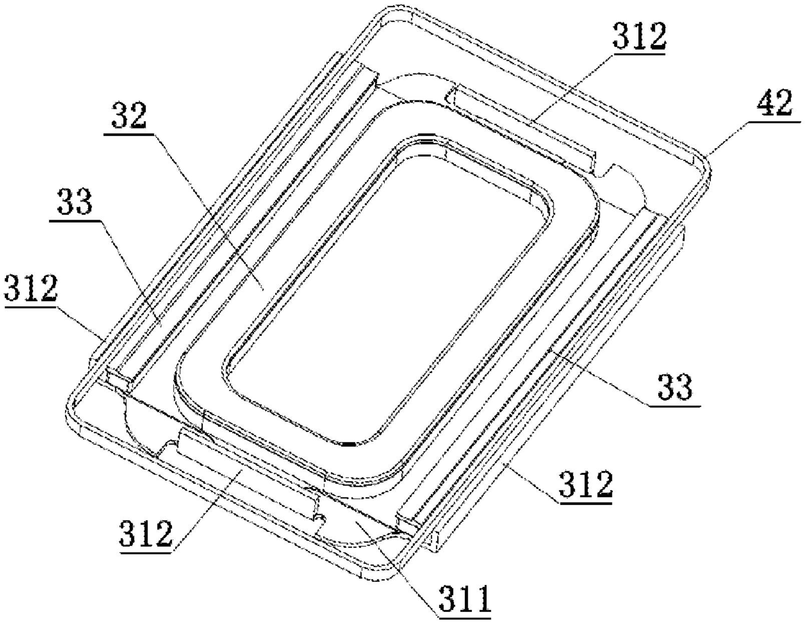
FIG. 5 is a structure view of a loudspeaker according to an embodiment of the present disclosure, with a shell, a vibration structure and a main voice coil removed.
Figure 6:
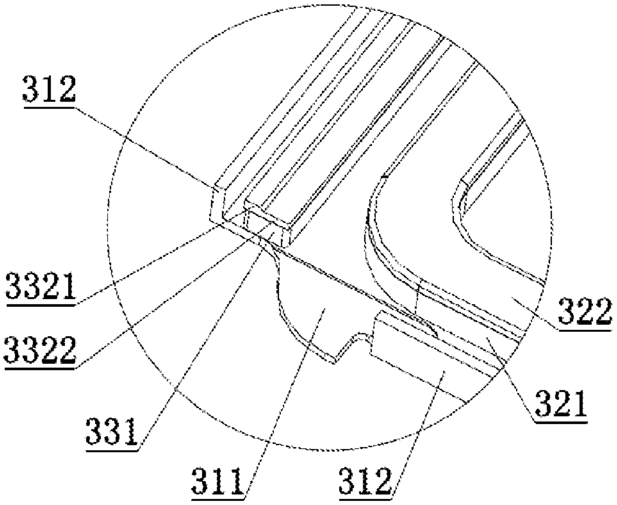
FIG. 6 is a partial view of a yoke, a main magnetic pole structure and an auxiliary magnetic pole structure cooperating with each other according to an embodiment of the present disclosure.
Figure 7:
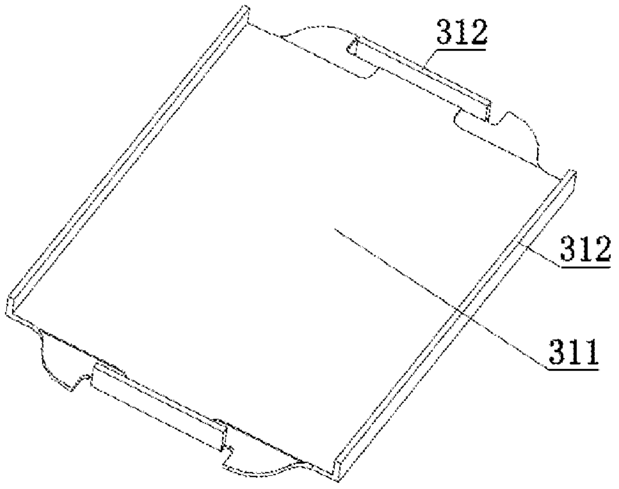
FIG. 7 is a structure view of a yoke according to an embodiment of the present disclosure.
Figure 8:
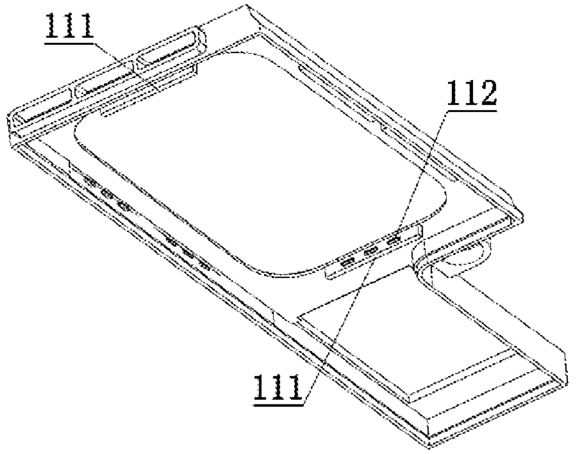
FIG. 8 is a structure view of a main shell body according to an embodiment of the present disclosure.
Figure 9:
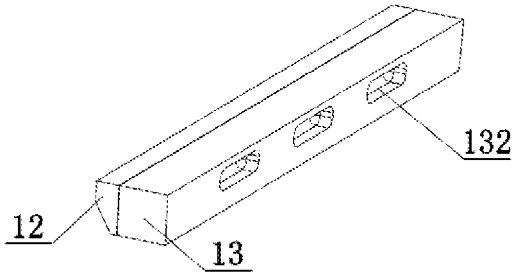
FIG. 9 is a structure view of an inner support body and an elastic member cooperating with each other according to an embodiment of the present disclosure.
Figure 10:
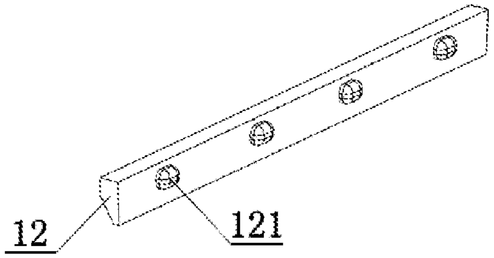
FIG. 10 is a structure view of an inner support body according to an embodiment of the present disclosure.
Figure 11:
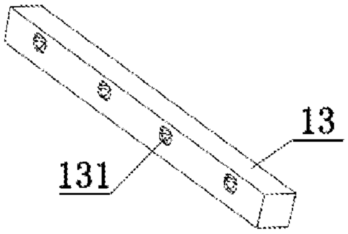
FIG. 11 is a structure view of an elastic member according to an embodiment of the present disclosure.

As shown in FIGS. 1 to 11, the present disclosure provides a loudspeaker. The loudspeaker includes a shell 1, a vibration structure 2, a magnetic circuit structure 3 and a voice coil 4. The shell 1 includes a main shell body 11, an inner support body 12 and an elastic member 13. The inner support body 12 is connected to the main shell body 11 through the elastic member 13. Multiple inner support bodies 12 are provided, and the multiple inner support bodies 12 are disposed in a surrounding manner to define an inner support cavity that penetrates in a first direction. The vibration structure 2 is connected to the main shell body 11. The magnetic circuit structure 3 is located in the inner support cavity and is sandwiched between the multiple inner support bodies 12. The voice coil 4 includes a main voice coil 41 and an auxiliary voice coil 42. The main voice coil 41 is connected to the vibration structure 2 and is movable relative to the magnetic circuit structure 3 in the first direction. The auxiliary voice coil 42 is disposed around an outer periphery of the main voice coil 41 and connected to the main shell body 11. When the main voice coil 41 and the auxiliary voice coil 42 are energized for operation, a direction of an acting force applied to the magnetic circuit structure 3 by the main voice coil 41 is opposite to a direction of an acting force applied to the magnetic circuit structure 3 by the auxiliary voice coil 42.

In the present disclosure, the elastic member 13 is provided in the shell 1 so that the impact force of the magnetic circuit structure 3 on the main shell body 11 of the shell 1 is reduced when the loudspeaker is in sound production operation. The inner support body 12 is provided so that the elastic member 13 can be injection molded between the main shell body 11 and the inner support bodies 12, and so that it is convenient to seal the elastic member during an injection molding while preventing the injection molding from being overflowed. With respect to the elastic member 13, the multiple inner support bodies 12 are disposed in a surrounding manner to define the inner support cavity that penetrates in the first direction, so that the magnetic circuit structure 3 can be more conveniently inserted between the multiple inner support bodies 12. On this basis, the main voice coil 41 of the voice coil 4 can drive the vibration structure 2 to act to perform the sound production operation. The auxiliary voice coil 42 of the voice coil 4 is connected to the main shell body 11, and the direction of the acting force applied to the magnetic circuit structure 3 by the auxiliary voice coil 42 when energized is opposite to the direction of the acting force applied to the magnetic circuit structure by the main voice coil 41 when energized, so that the impact force of the magnetic circuit structure 3 on the main shell body 11 of the shell 1 is further reduced.

Specifically, the elastic member 13 is sandwiched between the main shell body 11 and the inner support body 12 in a direction perpendicular to the first direction, and the magnetic circuit structure 3 is inserted into the inner support cavity in the first direction. The elastic member 13 and the inner support body 12 cooperate to limit and support the magnetic circuit structure 3 in a circumferential direction of the magnetic circuit structure 3, thereby ensuring the central alignment of the magnetic circuit structure 3 and the vibration structure 2 in the first direction, and enabling the auxiliary voice coil 42 to play a more reliable role in reducing vibration in the first direction.

More specifically, the main shell body 11 is provided with a support plate portion 111, and the inner support body 12 is connected to the support plate portion 111 through the elastic member 13. With the above arrangement, the elastic member 13 can be more conveniently sandwiched and installed between the main shell body 11 and the inner support body 12.

Specifically, the elastic member 13 is laid within the main shell body 11, and the inner support body 12 and the elastic member 13 are connected to each other. One of the inner support body 12 and the elastic member 13 is provided with a first convex head 121, and the other of the inner support body 12 and the elastic member 13 is provided with a first groove 131, and the first convex head 121 extends into the first groove 131. The first convex head 121 and the first groove 131 mates with each other so that the reliability of the connection between the inner support body 12 and the elastic member 13 is increased, and the detachment of the inner support body 12 from the elastic member 13 is avoided during use.

More specifically, one of the main shell body 11 and the elastic member 13 is provided with a second convex head 112, and the other of the main shell body 11 and the elastic member 13 is provided with a second groove 132, and the second convex head 112 extends into the second groove 132. With the above arrangement, the reliability of the connection between the main shell body 11 and the elastic member 13 is improved.

In this embodiment, the support plate portion 111 is disposed in the inner cavity of the main shell body 11, at least one support plate portion 111 is correspondingly provided for each inner support body 12, the first convex head 121 is disposed on the inner support body 12, and the second convex head 112 is disposed on the support plate portion 111. The elastic member 13 is made of silica gel, and both the first groove 131 and the second groove 132 are disposed on the elastic member 13. In addition to the above arrangement, the elastic member 13 may also be made of another material which may be injection molded and has the elasticity, such as rubber. In the direction perpendicular to the first direction, the first convex head 121 extends into the first groove 131, and the second convex head 112 extends into the second groove 132.

Specifically, the vibration structure 2 includes a center attaching plate and a vibration plate, the vibration plate is an annular structure, an outer peripheral side of the vibration plate is connected to the main shell body 11, an inner peripheral side of the vibration plate is connected to the center attaching plate, and the main voice coil 41 is connected to the vibration plate.

Specifically, the magnetic circuit structure 3 includes a yoke 31, a main magnetic pole structure 32 and an auxiliary magnetic pole structure 33. The yoke 31 is sandwiched between the multiple inner support bodies 12. The main magnetic pole structure 32 is disposed on the yoke 31, and the main voice coil 41 is disposed around an outer periphery of the main magnetic pole structure 32. The auxiliary magnetic pole structure 33 is disposed on the yoke 31 and is located outside the main voice coil 41, and the auxiliary voice coil 42 is disposed around an outer periphery of the auxiliary magnetic pole structure 33. With the above arrangement, under the separation of the auxiliary magnetic pole structure 33, the mutual influence between the main voice coil 41 and the auxiliary voice coil 42 is avoided, and the magnetic flux through the main voice coil 41 and the auxiliary voice coil 42 is ensured.

More specifically, multiple auxiliary magnetic pole structure 33 are provided, and the multiple auxiliary magnetic pole structures 33 are disposed around the outer periphery of the main magnetic pole structure 32. With the above arrangement, the magnetic flux through the auxiliary voice coil 42 is further ensured, whereby the force applied to the auxiliary voice coil 42 is more balanced.

Specifically, the yoke 31 includes a bottom plate portion 311 and multiple support plate portions 312 connected to the bottom plate portion 311. The main magnetic pole structure 32 and the auxiliary magnetic pole structure 33 are each disposed on the bottom plate portion 311 and located between the multiple support plate portions 312, and the support plate portions 312 abut against the inner support bodies 12. With the above arrangement, the installation between the yoke 31 and the shell 1 is made more reliable.

More specifically, four support plate portions 312 are provided, one support plate portion 312 is disposed at each of two ends of the bottom plate portion 311 in a second direction, and one support plate portion 312 is disposed at each of two ends of the bottom plate portion 311 in a third direction, where the first direction, the second direction and the third direction are perpendicular to each other. The yoke 31 is erected within the shell 1 through the four support plate portions 312 so that the structure is simpler on the basis of ensuring the stability.

Specifically, the support plate portions 312 at two ends of the bottom plate portion 311 in the second direction are first support plate portions, and the first support plate portions are located inside the auxiliary voice coil 42, thereby facilitating the assembly and positioning of the magnetic circuit system 3.

More specifically, the support plate portions 312 at two ends of the bottom plate portion 311 in the third direction are second support plate portions, two auxiliary magnetic pole structure 33 are provided, and one auxiliary magnetic pole structure 33 is sandwiched between each second support plate portion and the main magnetic pole structure 32. The second support plate portions are located outside the auxiliary voice coil 42, that is, in the third direction, the main voice coil 41 is separated from the auxiliary voice coil 42 by the auxiliary magnetic pole structure 33, and the electromagnetic induction effect of the auxiliary voice coil 42 becomes stronger by fully utilizing the second support plate portions to guide magnetic inductance lines on the outer side.

In this embodiment, the bottom plate portion 311 of the yoke 31 has a rectangular sheet-like structure, the second direction is a length direction of the bottom plate portion 311, and the third direction is a width direction of the bottom plate portion 311. Two first support plate portions, corresponding support plate portions 111 and corresponding elastic members 13 are located inside the auxiliary voice coil 42, and two second support plate portions, corresponding support plate portions 111 and corresponding elastic members 13 are located outside the auxiliary voice coil 42. The auxiliary magnetic pole structure 33 is disposed between the second support plate portion and the main magnetic pole structure 32, which makes the corresponding size larger, and thus makes the electromagnetic induction effect of the secondary voice coil 42 stronger.

Specifically, a magnetic pole direction of the main magnetic pole structure 32 is opposite to a magnetic pole direction of the auxiliary magnetic pole structure 33, thereby ensuring the magnetic flux through the main voice coil 41 and the auxiliary voice coil 42.

More specifically; the main magnetic pole structure 32 includes a main magnet 321 and a main magnetic pole piece 322. The main magnet 321 is ring-shaped and disposed on a side of the yoke 31 facing the vibration structure 2. The main magnetic pole piece 322 is ring-shaped and disposed on a side of the main magnet 321 facing the vibration structure 2.

More specifically; the auxiliary magnetic pole structure 33 includes an auxiliary magnet 331 and an auxiliary magnetic pole piece 332. The auxiliary magnet 331 is elongated and disposed on a side of the yoke 31 facing the vibration structure 2. The auxiliary magnetic pole piece 332 is elongated and disposed on a side of the auxiliary magnet 331 facing the vibration structure 2.

In this embodiment, the auxiliary pole piece 332 includes a first piece body 3321 and a second piece body 3322 connected to each other, a thickness of the first piece body 3321 in the first direction is greater than a direction of the second piece body 3322 in the first direction, and the first piece body 3321 faces away from the main magnetic pole structure 32 relative to the second piece body 3322. The above arrangement adapts to the space structure inside the shell 1, so that the symmetry of the BL and the BL value are ensured, and the magnetic flux through the auxiliary voice coil 42 is targetedly increased. In the technical parameters of the loudspeaker, a product of the B value and the L value reflects the dynamic performance of the loudspeaker, where B is a magnetic induction intensity in the magnetic gap (Unit: tesla), and L is a length of the voice coil wire (Unit: meter). The larger the product value of BL, the greater the generated force.

When the elastic member 13 is separately provided, the vibration damping effect cannot cover the resonance frequency range of the loudspeaker. A resonance frequency of the loudspeaker is set to be A, and the resonance frequency range includes A. When the loudspeaker in the present disclosure operates in the resonance frequency interval, the auxiliary voice coil 42 is energized, so that on the basis of energy conservation, the auxiliary voice coil 42 can cooperate with the elastic member 13 to play a targeted vibration reduction role.

Apparently, the above-described embodiments of the present disclosure are merely examples for clearly illustrating the present disclosure and are not intended to limit the implementation modes of the present disclosure. Other variations or modifications in different forms may be made in light of the above description for those of ordinary skill in the art. This need not be, nor should it be exhaustive of all implementation modes.

What is claimed is:

1. A loudspeaker, comprising:

a shell, wherein the shell comprises a main shell body, an inner support body and an elastic member, the inner support body is connected to the main shell body through the elastic member, a plurality of inner support bodies are provided, and the plurality of inner support bodies are disposed in a surrounding manner to define an inner support cavity that penetrates in a first direction;

a vibration structure, wherein the vibration structure is connected to the main shell body;

a magnetic circuit structure, wherein the magnetic circuit structure is located in the inner support cavity and is sandwiched between the plurality of inner support bodies; and a voice coil, wherein the voice coil comprises a main voice coil and an auxiliary voice coil, the main voice coil is connected to the vibration structure and is movable in the first direction relative to the magnetic circuit structure, the auxiliary voice coil is disposed around an outer periphery of the main voice coil and connected to the main shell body, when the main voice coil and the auxiliary voice coil are energized for operation, a direction of an acting force applied to the magnetic circuit structure by the main voice coil is opposite to a direction of an acting force applied to the magnetic circuit structure by the auxiliary voice coil;

wherein the magnetic circuit structure comprises:

a yoke, wherein the yoke is sandwiched between the plurality of inner support bodies, the yoke comprises a bottom plate portion and a plurality of support plate portions connected to the bottom plate portion, and the plurality of support plate portions comprises first support plate portions and second support plate portions; and wherein support plate portions at two ends of the bottom plate portion in a second direction are the first support plate portions, and the first support plate portions are located inside the auxiliary voice coil; and support plate portions at two ends of the bottom plate portion in a third direction are the second support plate portions, and the second support plates are located outside the auxiliary voice coil.

2. The loudspeaker of claim 1, wherein the elastic member is sandwiched between the main shell body and the inner support body in a direction perpendicular to the first direction.

3. The loudspeaker of claim 1, wherein the elastic member is laid within the main shell body, one of the inner support body and the elastic member is provided with a first convex head, the other of the inner support body and the elastic member is provided with a first groove, and the first convex head extends into the first groove.

4. The loudspeaker of claim 1, wherein the magnetic circuit structure further comprises:

a main magnetic pole structure, wherein the main magnetic pole structure is disposed on the yoke, and the main voice coil is disposed around an outer periphery of the main magnetic pole structure; and at least one auxiliary magnetic pole structure, wherein the at least one auxiliary magnetic pole structure is disposed on the yoke and located outside the main voice coil, and the auxiliary voice coil is disposed around an outer periphery of the auxiliary magnetic pole structure.

5. The loudspeaker of claim 4, wherein the main magnetic pole structure and the auxiliary magnetic pole structure are each disposed on the bottom plate portion and located between the plurality of support plate portions, and the plurality of support plate portions abut against the plurality of inner support bodies.

6. The loudspeaker of claim 5, wherein the second direction is perpendicular to the first direction.

7. The loudspeaker of claim 6, wherein two auxiliary magnetic pole structures among the at least one auxiliary magnetic pole structure are provided, the main magnetic pole structure is sandwiched between the two auxiliary magnetic pole structures in the third direction and the third direction is perpendicular to the first direction and the second direction.

8. The loudspeaker of claim 4, wherein the main magnetic pole structure comprises:

a main magnet, wherein the main magnet is ring-shaped and disposed on a side of the yoke facing the vibration structure; and a main magnetic pole piece, wherein the main magnetic pole piece is ring-shaped and disposed on a side of the main magnet facing the vibration structure.

9. The loudspeaker of claim 4, wherein the auxiliary magnetic pole structure comprises:

an auxiliary magnet, wherein the auxiliary magnet is elongated and disposed on a side of the yoke facing the vibration structure; and an auxiliary magnetic pole piece, wherein the auxiliary magnetic pole piece is elongated and disposed on a side of the auxiliary magnet facing the vibration structure.

10. The loudspeaker of claim 9, wherein the auxiliary magnetic pole piece comprises a first piece body and a second piece body connected to each other, a thickness of the first piece body in the first direction is greater than a thickness of the second piece body in the first direction, and the first piece body faces away from the main magnetic pole structure relative to the second piece body.

* * * * *